(12) United States Patent
Mehta

(10) Patent No.: US 8,528,031 B2
(45) Date of Patent: Sep. 3, 2013

(54) DISTRIBUTED DIAGNOSTICS FOR INTERNET VIDEO LINK

(75) Inventor: Viral Mehta, San Diego, CA (US)

(73) Assignees: Sony Corporation, Tokyo (JP); Sony Electronics Inc., Park Ridge, NJ (US)

( * ) Notice: Subject to any disclaimer, the term of this patent is extended or adjusted under 35 U.S.C. 154(b) by 368 days.

(21) Appl. No.: 12/974,108

(22) Filed: Dec. 21, 2010

(65) Prior Publication Data

US 2011/0088072 A1    Apr. 14, 2011

Related U.S. Application Data

(62) Division of application No. 12/151,619, filed on May 8, 2008, now Pat. No. 8,225,362.

(51) Int. Cl.
*H04N 7/173* (2011.01)

(52) U.S. Cl.
USPC ........... 725/107; 725/121; 709/217; 709/221; 709/224; 370/248; 370/249; 370/252

(58) Field of Classification Search
None
See application file for complete search history.

(56) References Cited

U.S. PATENT DOCUMENTS

| | | |
|---|---|---|
| 2007/0058043 A1 | 3/2007 | Thukral |
| 2007/0061831 A1 | 3/2007 | Savoor et al. |
| 2007/0283401 A1 | 12/2007 | Lee et al. |
| 2008/0060035 A1 | 3/2008 | Tsang et al. |
| 2008/0072264 A1 | 3/2008 | Crayford |
| 2008/0168520 A1 | 7/2008 | Vanderhoff et al. |
| 2008/0301666 A1 | 12/2008 | Gordon et al. |

OTHER PUBLICATIONS

Press Release, "Sony Sets Price and Shipping Date for Bravia Internet Video Link," Sony Electronics, Feb. 27, 2007.

*Primary Examiner* — Jason J Chung
(74) *Attorney, Agent, or Firm* — Miller Patent Services; Jerry A. Miller

(57) ABSTRACT

In one embodiment consistent with the invention a method of quality of service (QOS) data aggregation and service management for Internet Protocol Television (IPTV) involves receiving data from a plurality of DDRIVL collector devices representing QOS service for sets of IPTV content providers assigned to each collector device, with each collector device being in a separate specified region of Internet service; evaluating from a geographic and interconnection perspective the data from the plurality of collector devices to isolate IPTV receivers located in areas where problems with IPTV service is likely to be occurring; and populating the isolated IPTV receivers with channel set tuning information that either excludes or flags the channels that may be having problems with IPTV service. This abstract is not to be considered limiting, since other embodiments may deviate from the features described in this abstract.

2 Claims, 6 Drawing Sheets

DISTRIBUTED DIAGNOSTICS FOR INTERNET VIDEO LINK

CROSS REFERENCE TO RELATED DOCUMENTS

This application is a divisional application of U.S. patent application Ser. No. 12/151,619 to Mehta filed May 8, 2008 now U.S. Pat. No. 8,224,362 which is hereby incorporated herein by reference.

COPYRIGHT AND TRADEMARK NOTICE

A portion of the disclosure of this patent document contains material which is subject to copyright protection. The copyright owner has no objection to the facsimile reproduction of the patent document or the patent disclosure, as it appears in the Patent and Trademark Office patent file or records, but otherwise reserves all copyright rights whatsoever. Trademarks are the property of their respective owners.

BACKGROUND

Internet protocol television services are beginning operation and will soon be a common way for consumers to obtain television programming. However, since the Internet was not designed for such applications, the quality can vary depending upon many factors.

IVL (known commercially as BIVL™—Bravia™ Internet Video Link, trademark of Sony Corporation) is a video streaming device that is able to connect to a multitude of servers in varying locations in order to provide television services via the Internet. This causes multiple network paths to become evident to each IVL unit based on location, ISP, etc. This means that quality of service QoS can vary due to a number of factors. A system is needed to allow for distributed diagnostics for the Internet video link, thereby, allowing QoS testing from which various tweaking can occur from the data gathered by DDRIVL (Distributed Diagnostics for the Internet Video Link) to enhance the user experience.

BRIEF DESCRIPTION OF THE DRAWINGS

Certain illustrative embodiments illustrating organization and method of operation, together with objects and advantages may be best understood by reference detailed description that follows taken in conjunction with the accompanying drawings in which.

DETAILED DESCRIPTION

Figure 1:
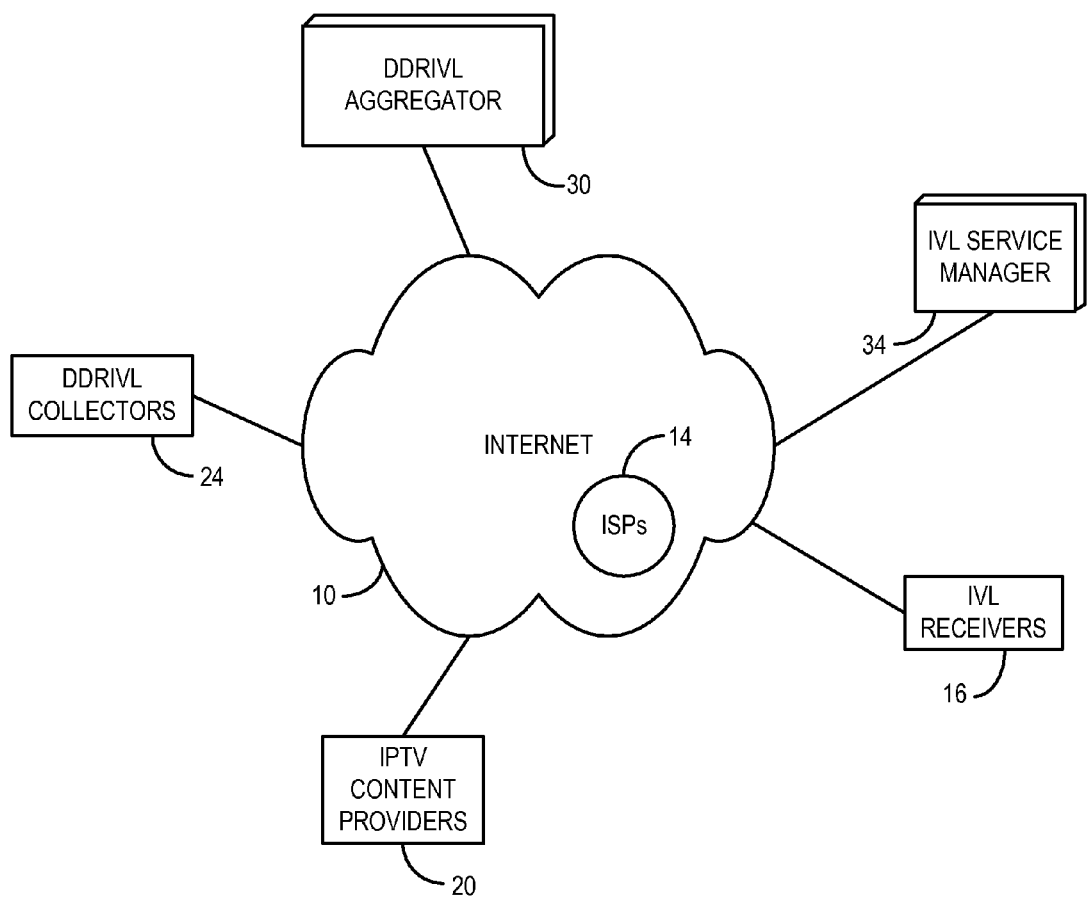
FIG. 1 is a diagram depicting the various components used in connection with the DDRIVL system consistent with certain embodiments of the present invention.

While this invention is susceptible of embodiment in many different forms, there is shown in the drawings and will herein be described in detail specific embodiments, with the understanding that the present disclosure of such embodiments is to be considered as an example of the principles and not intended to limit the invention to the specific embodiments shown and described. In the description below, like reference numerals are used to describe the same, similar or corresponding parts in the several views of the drawings.

The terms "a" or "an", as used herein, are defined as one or more than one. The term "plurality", as used herein, is defined as two or more than two. The term "another", as used herein, is defined as at least a second or more. The terms "including" and/or "having", as used herein, are defined as comprising (i.e., open language). The term "coupled", as used herein, is defined as connected, although not necessarily directly, and not necessarily mechanically. The term "program" or "computer program" or similar terms, as used herein, is defined as a sequence of instructions designed for execution on a computer system. A "program", or "computer program", may include a subroutine, a function, a procedure, an object method, an object implementation, in an executable application, an applet, a servlet, a source code, an object code, a shared library/dynamic load library and/or other sequence of instructions designed for execution on a computer system.

The term "program", as used herein, may also be used in a second context (the above definition being for the first context). In the second context, the term is used in the sense of a "television program". In this context, the term is used to mean any coherent sequence of audio video content such as those which would be interpreted as and reported in an electronic program guide (EPG) as a single television program, without regard for whether the content is a movie, sporting event, segment of a multi-part series, news broadcast, etc. The term may also be interpreted to encompass commercial spots and other program-like content which may not be reported as a program in an electronic program guide.

Reference throughout this document to "one embodiment", "certain embodiments", "an embodiment" or similar terms means that a particular feature, structure, or characteristic described in connection with the embodiment is included in at least one embodiment of the present invention. Thus, the appearances of such phrases or in various places throughout this specification are not necessarily all referring to the same embodiment. Furthermore, the particular features, structures, or characteristics may be combined in any suitable manner in one or more embodiments without limitation.

The term "or" as used herein is to be interpreted as an inclusive or meaning any one or any combination. Therefore, "A, B or C" means "any of the following: A; B; C; A and B; A and C; B and C; A, B and C". An exception to this definition will occur only when a combination of elements, functions, steps or acts are in some way inherently mutually exclusive.

The term "processor", "controller", "CPU", "Computer" and the like as used herein encompasses both hard programmed, special purpose, general purpose and programmable devices and may encompass a plurality of such devices or a single device in either a distributed or centralized configuration without limitation.

The term DDRIVL as used herein is an abbreviation for Distributed Diagnostics for Internet Video Link, and is used as a modifier for several of the components used in the Internet diagnostic systems consistent with embodiments of the present invention as well as for the overall system itself including diagnosed components and systems.

The term IVL as used herein is an abbreviation for Internet Video Link. In one commercial embodiment, Sony Electronics Inc.'s Bravia® Internet Video Link (BIVL) may be considered IVL. An IVL receiver thus refers to a device, whether television set receiver, set top box (STB) receiver, set back box (SBB) receiver or any other physical embodiment of a receiver for receipt of Internet Protocol Television (IPTV) services.

The term Internet Service Provider (ISP) is used in its accepted sense as an entity that provides for access to the Internet. Commercial ISPs include such providers as various cable television systems (e.g., Cox Cable, Time Warner Cable, etc.), telephone companies (e.g., AT&T, Embarq, NTT, etc.) and other providers that provide high speed Internet service suitable for Internet Protocol Television (IPTV). The term IPTV Content Provider is used to describe any source of IPTV or similar audio/video (A/V) content via the Internet. Commercial examples as of this writing include, but are not limited to such services offered by Yahoo, AOL and Grouper in the U.S. In Hong Kong, PCCW and City Telecom provide IPTV services, while in Europe France Telecom, Free, and Neuf are offered as well as PCCW and City Telecom. In Japan, Nippon Telephone and Telegraph (NTT), KDDI, and Softbank offer IPTV services. The above is by no mean intended to be an exhaustive list, but merely illustrative. As IPTV becomes more widely available, other content providers are likely to evolve.

It should also be noted that there can be a great deal of overlap between ISPs and IPTV service providers. For example, IPTV is currently offered by NTT which also provides ISP services. Similarly, AOL provides IPTV as well as ISP services. However, for purposes of this document, it is instructive to treat the two as separate entities since one might use a first ISP to obtain content from a second ISP that also serves as an IPTV content provider, with the understanding that they may represent a common corporate entity and be physically located in the same or overlapping facilities. Hence, for purposes of this document, the various terms will apply to the role being played by any given entity (including dual roles where applicable).

The term node as used herein is intended to mean any of the network nodes reported on by the DDRIVL collectors, and as will be clear from context, may also refer to the DDRIVL collector itself. In the case of a DDRIVL collector node, such node can be embodied as a minimal personal computer (PC) configuration with network connections and Internet access. In certain preferred embodiments, a LAMP box can be used, but this should not be considered limiting since other hardware and software configurations can be implemented to carry out the DDRIVL functions. (A "LAMP box" is a computer running Linux, Apache, MySQL and PHP, which can be used for many functions including the DDRIVL collector node or a web server.)

An IVL receiver unit alone is not currently capable of providing such detailed statistics regarding QoS. A major problem during the development of and the servers that serve it content was that there was no other product able to provide a standard to which the IVL to server interaction was to be testing against. So there would be no way to know whether IVL was failing due to deficiency in its own software or because the server was not implemented correctly. Another problem that DRIVL aims to solve in certain embodiments is ISP network throughput. The greater number of DDRIVL collector nodes placed on each ISP, the more statistics can be gathered and analyzed to judge content delivery speed.

In systems consistent with the present embodiment, provision is made to keep track of the content available through each service provider and verifies if the content is appropriate to ingest by. If a service provider does not meet a set of basic specifications it will be automatically removed from the Service Management system so a customer might never see a problem if one were to occur, thereby, improving their experience.

In systems exemplary of the present invention, developers, technical support, the business group, and management to get a clear understanding of the performance, QoS, and content information of the IVL's current service providers. The system also has the capability of generating emails upon detecting a service problem and also produces daily reports for QoS and content freshness (used by the business group).

Turning now to FIG. 1, the various components used in connection with the DDRIVL system are depicted. In each case, one block is used to represent multiple entities except as explicitly noted. This drawing is presented by way of illustration of the interconnection of each of the relevant components, systems and services by way of the Internet 10. The ISPs 14 are shown embedded within the Internet 10 since they are used in most cases for the other components to interconnect to each other and to otherwise connect to other resources on the Internet 10, however the individual functionality of the ISP, or shortcomings, are a part of the diagnostic functions carried out by the system presented herein.

In this illustration, a plurality of IVL receivers 16 (which could equally well be considered IPTV receivers in any physical configuration) are connected to the Internet 10 via any suitable ISP 14 in order to receive content from any of a plurality of IPTV content providers 20. A plurality of DDRIVL collectors 24 are also connected to the Internet 10 in various strategic locations so as to collect information about the various Internet pathways (including the ISPs 14) and the various content providers. This information is reported to the DDRIVL aggregator 30 for analysis. Where action is necessary, such action is taken by way of IVL service manager 34, with IVL service manager 34 either being directly coupled to DDRIVL aggregator 30 as shown by the dashed line, or via another connection through the Internet. The IVL service manager 34 oversees operation of all of the IVL receivers 16 in that it provides the receivers with information about the availability of the IPTV content as well as quality of service data or other data that can be used to optimize the viewing experience. For example, if service is less than optimum, the IVL service manager 34 may indicate to a particular IVL receiver 16 or group of receivers that a particular IPTV service provider 20 is only able to provide content at reduced resolution.

There may be a single DDRIVL aggregator 30 and a single IVL service manager, or there may be several or many. In any event, these entities are shown with shadows to indicate that they should preferably be implemented using redundant systems for safety in the event of failure of a primary system, since their proper operation is integral to the IVL receivers 15 proper receipt of content.

Figure 2:
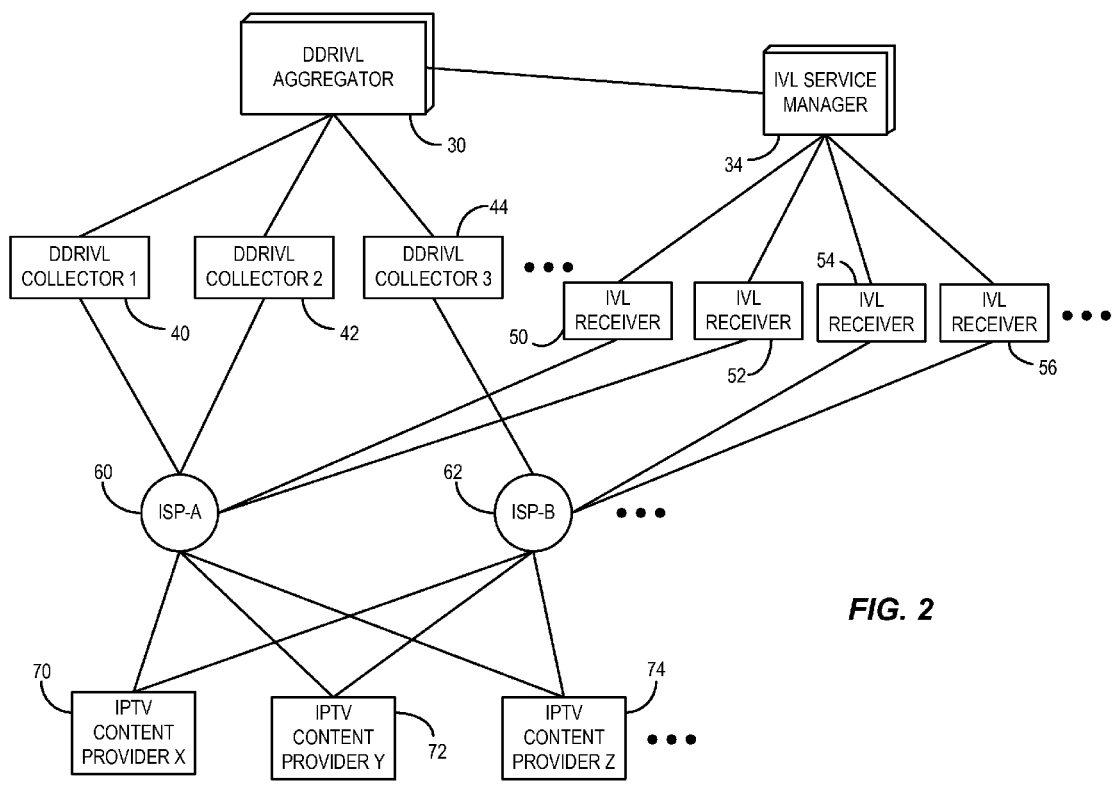
FIG. 2 depicts an example of a DDRIVL enabled IPTV system consistent with certain embodiments of the present invention.

FIG. 2 depicts an example of a DDRIVL enabled IPTV system consistent with certain embodiments with the Internet 10 connections removed for purposes of illustrating the actual communication pathways. For clarity in this illustration, three DDRIVL collectors 40, 42 and 44 are shown, four IVL receivers 50, 52, 54 and 56 are shown, two ISPs 60 and 62 are shown and three IPTV content providers 70, 72 and 74 are shown, with the understanding that the arrangement can be massively scaled upward in any dimension. For correlation with FIG. 1, each of the DDRIVL collectors are represented by 24, each of the IVL receivers are represented by 16, each of the ISPs are represented by 14 and each of the IPTV content providers are represented by 20, and may be generally referred to by these reference numbers for generalization or more particularly referred to by the numbers in FIG. 2 for particular examples. For ease of illustration, the number of elements is limited as shown, but can be readily extrapolated into much larger numbers in field implementations.

Figure 3:
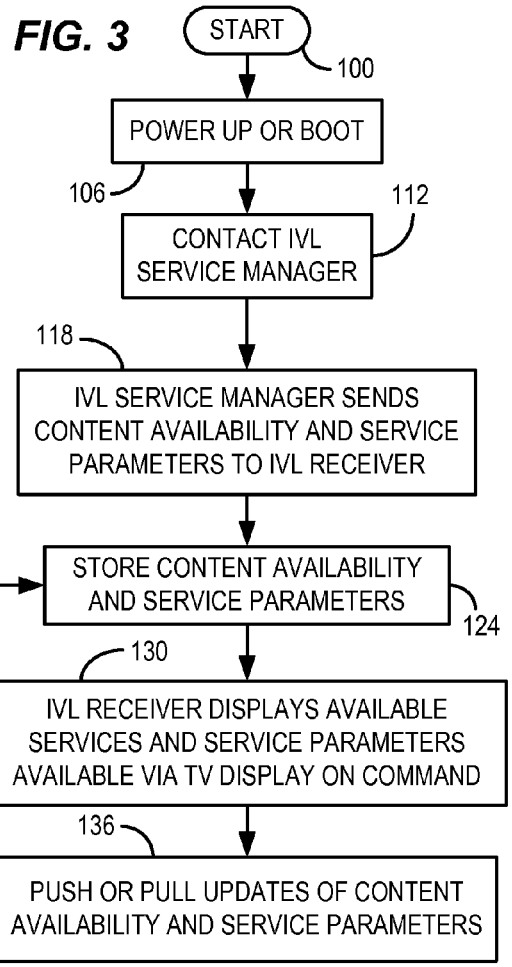
FIG. 3 is a flow chart depicting an example of each IVL receiver's operation consistent with certain embodiments of the present invention.

In operation, each IVL receiver's operation is generally depicted in FIG. 3, starting at 100 after which the IVL receiver 16 boots up, restarts or otherwise initializes at 106. Once fully operational, the IVL receiver contacts the IVL service manager 34 through its ISP 14 and the Internet 10 at 112. In so doing, the IVL receiver 16 identifies itself and is authenticated as a legitimate IVL receiver to the IVL service manager 34. The IVL service manager 34 then at 118 sends information to the IVL receiver 16 enabling IVL receiver 16 to receive IPTV content from any of several operational IPTV content providers 20. Such information may include IP addresses for the content, program guide information, metadata, as well as a set of parameters for receipt of the content. Such parameters may include a measure of quality of service (QOS), as well as parameters for maximum or fixed resolution for retrieval of the IPTV content for each IPTV content provider 20 (based on the IPTV content provider 20's ability to provide service at acceptable quality levels to the DDRIVL collectors 24 and IVL receivers 16 whose quality is judged by the aggregator 30 to be comparable to the DDRIVL collectors reporting quality information. In the event a particular IPTV content provider 20 is either not functioning, or there is a problem with one or more of the various links or ISP networks through which the content is to be supplied to a particular IVL receiver, a particular IPTV content provider may be withheld from a listing for any particular IVL receiver to avoid user frustration when attempting to view the content. Such information can be gleaned from the diagnostic processes to be described later.

At 124, the content availability and associated service parameters, etc. are stored for use by the IVL receiver 16. The information can then be displayed at the user's command as a part of the user interface for IPTV reception on the IVL receiver 16's associated display (not explicitly shown). The IVL receiver 16 continues to use this information as described until, by virtue of a push or pull operation, updated information is received from the IVL service manager 34 at 136. Such information can, for example, be requested by the IVL receiver on a periodic basis, or can be updated at the initiation of the IVL service manager 34, either on a periodic basis or as changes in service parameters are identified.

By way of example, if a particular one of the IPTV content providers 20 goes down and is unable to provide content, the IVL service manager can remove the particular IPTV content provider from the IVL receivers 16 so that the users will be advised that there is no point "tuning" to that particular IPTV content provider. Once service is restored, the IVL service manager 34 can update the IVL receivers accordingly so that that particular content provider can again be listed by the IVL receiver as a supplier of content. In this example, the user is spared the frustration of attempting to view content that is either not present or of such poor quality as to be deemed by the IVL service manager 34 or DDRIVL aggregator 30 to be unworthy of listing. Hence, if a particular segment of service is unavailable, the user perceives a better service experience by never seeing a listing for content that is of seriously inferior quality or unavailable.

In another example, if a particular ISP such as 62 is experiencing low throughput so as to impact the quality of IPTV content delivered to its customers, the IVL service manager 34 can notify IVL receivers 54 and 56 and provide an indication that service is either down or can only be delivered at lower resolution. Since ISP 60 still provides quality service, there is no need to provide similar notification to IVL receivers 50 and 52.

In order to obtain the QOS information used to deduce the status of the network at its various sites, the network status is first ascertained using DDRIVL collectors 24 which gather information about the network. This information is then sent to DDRIVL aggregator 30 which assimilates the information gathered from the DDRIVL collectors 24 in order to ascertain the status of the network at any given instant. It should be noted that the Internet is a complex and ever changing network. Content received over the Internet 10 may arrive using any number of pathways. Problems at any location from the content source (IPTV content providers 20) to the content sink (IVL receivers 16) can cause any particular IVL receiver to be unable to receive particular content.

In embodiments consistent with the present invention, DDRIVL collectors 24 behave as emulators of an IVL receiver. (Hence, in other embodiments, certain of the IVL receivers 16 themselves can be adapted to behave as a DDRIVL collector.) Multiple DDRIVL collectors 24 such as 40, 42 and 44 are distributed throughout the network. These collectors 24 then operate in a number of modes to ascertain and report the condition of the network.

Figure 4:
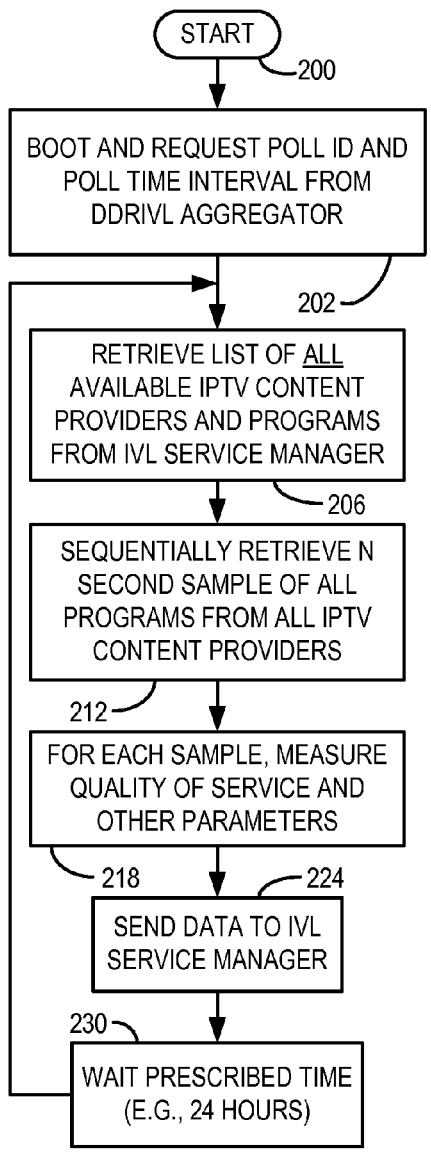
FIG. 4 depicts an example of one mode of operation of the DDRIVL collectors consistent with certain embodiments of the present invention.

With reference to FIG. 4, one mode of operation of the DDRIVL collectors 24 is described starting at 200 after which the DDRIVL collector 24 boots up and requests/receives a Poll ID from the DDRIVL aggregator 30 to identify itself with a particular polling time interval at 202. Thus, the DDRIVL collectors 24 connects to the DDRIVL aggregator 30 before it starts testing the service providers and is assigned a poll ID from the DDRIVL aggregator 30 so that when it returns to drop off results to the DDRIVL aggregator 30 the DDRIVL collectors 24 can readily be associated with a set of tests and a known polling time interval. The DDRIVL collector 24 retrieves a listing of all available services at 206 from the IVL service manager 34. In the event the service manager does not respond, the DDRIVL collector 24 may assume that its current listing is unchanged and proceed to 212 where an N second sample of each program from each IPTV content provider is sequentially retrieved as a test. By way of example and not limitation, the N second sample can be a 1-20 second sample for each program on each IPTV content provider 20 taken at the polling time interval. As a result of the retrieval of a sample of all content, the DDRIVL collectors 24 can make an estimated determination as to the current state of each program, each content provider and each element of the network disposed between the DDRIVL collectors 24 and the IPTV content providers 20.

By virtue of retrieving a sample of each program from each IPTV content provider 20, the DDRIVL collectors 24 can ascertain a number of significant pieces of information, such as: verification that each program is actually active, verify the identity of the program, check for the presence and validity of a thumbnail representation of the video, measure the bit rate on the retrieved sample, measure the error rate of the retrieved sample, determine other attributes of the program or IPTV service provider 20. This information is measured at 218 and the results are sent to the DDRIVL aggregator 30 at 224. The process then ends for a period of time (e.g., one day) at 230, and then repeats at the periodic rate defined for 230.

Since this process is carried out by many DDRIVL collectors 24 distributed throughout the network, the results from the various DDRIVL collectors 24 can be compared and analyzed at the DDRIVL aggregator 30. However, in view of the dynamic nature of the Internet 10, it is desirable to provide more timely updates than can be handled by downloading a sample of each program from each IPTV content provider 20.

Figure 5:
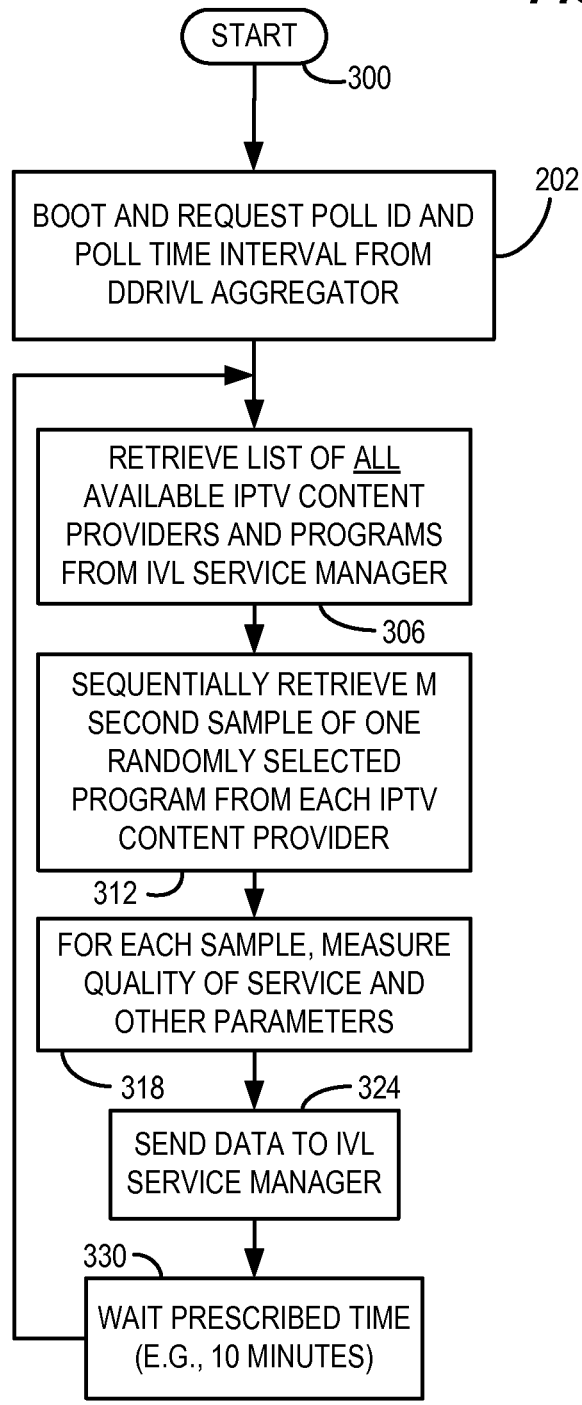
FIG. 5 is a flow chart depicting another mode of operation of the DDRIVL collectors in a manner consistent with certain embodiments of the present invention.

In order to provide more timely notification of major issues, the DDRIVL collectors 24 can also operate in a second mode as depicted in FIG. 5 starting at 300 after which the DDRIVL collector 24 boots up and requests/receives a Poll ID from the DDRIVL aggregator 30 to identify itself with a second shorter particular polling time interval at 202 as in FIG. 4. The Poll ID may be the same, but two polling time intervals are retrieved. The shorter polling time interval may be on the order of minutes or hours (e.g., every 10-20 minutes), for example. Thus, the DDRIVL collectors 24 connects to the DDRIVL aggregator 30 before it starts testing the service providers and is assigned a poll ID from the DDRIVL aggregator 30 so that when it returns to drop off results to the DDRIVL aggregator 30 the DDRIVL collectors 24 can readily be associated with a set of tests and a known polling time interval. The DDRIVL collector 24 retrieves a listing of all available services at 206 from the IVL service manager 34. In the event the service manager does not respond, the DDRIVL collector 24 may assume that its current listing is unchanged and proceed to 212 where an M second sample of each program from each IPTV content provider is sequentially retrieved as a test. By way of example, the M second sample can be a 1-10 second sample for each program on each IPTV content provider 20. As a result of the retrieval of a sample of all content, the DDRIVL collectors 24 can make a determination as to the current state of each program (including the program identity), each content provider and each element of the network disposed between the DDRIVL collectors 24 and the IPTV content providers 20.

By virtue of retrieving a sample of one randomly selected program from each IPTV content provider 20, the DDRIVL collectors 24 can ascertain a number of significant pieces of information, such as: verification that each program is actually active, verify the identity of the program, check for the presence and validity of a thumbnail representation of the video, measure the bit rate on the retrieved sample, measure the error rate of the retrieved sample, determine other attributes of the program or IPTV service provider 20. This information is measured at 318 and the results are sent to the DDRIVL aggregator 30 at 324. The process then ends for a much shorter period of time than before (e.g., 10 minutes) at 330, and then repeats at the periodic rate defined for 330.

Since this process is carried out by many DDRIVL collectors 24 distributed throughout the network, the results from the various DDRIVL collectors 24 can be compared and analyzed at the DDRIVL aggregator 30. By way of example and not limitation, consider the arrangement of FIG. 2. Once information is aggregated from the DDRIVL collectors 40 as described, the data from the DDRIVL collectors 40, 42 and 44 can be analyzed.

The DDRIVL aggregator can serve not only to provide data to the IVL service manager 34, but can also provide data to the IPTV content providers 20 and the ISPs 14. For example, DDRIVL aggregator 30 can advise IPTV content provider 20 that a particular program has been offered for an extended period of time, which may indicate that it is time to rotate the content.

In an exemplary embodiment, the retrieval of information from the DDRIVL collectors is implemented by polling from the DDRIVL aggregator that occurs every 10 minutes for every node. This data is analyzed and the following metrics are collected: a) download bit rate, b) service availability, c) server response time from IPTV content provider, d) asset count is collected (number of videos each service provider has), e) each asset (video or program) is tested for validity, and f) each thumbnail representation of each asset is tested for validity.

The responses from the DDRIVL collectors is then reported to the DDRIVL aggregator 30 that further analyses this data for validity due to the fact that a network error on any node could have corrupted the information at that particular node. A system wide decision is made and reported to a central database at the DDRIVL aggregator 30. A web interface was created to present this data to customer support, third party developers, management, and the business groups associated with all aspects of delivery and reception of the IPTV content. Thus, the diagnostic system can be used not only to directly control the IVL receiver access to content, but also to provide a diagnostic tool for the IPTV content providers and ISPs.

Consider the following scenarios:
Scenario 1:
Test results: DDRIVL collector 40 and 42 both report no content is available from IPTV content provider 72. DDRIVL collector 44 reports content from IPTV content provider 72.
Conclusion: IPTV content provider 72 is operational. ISP 60 may be experiencing problems, or the connection from ISP A to content provider 72 may be experiencing problems.
Action: IVL service manager 34 can remove IPTV content provider 72 from availability for IVL receivers 50 and 52, while leaving them on the available list for IVL receivers 54 and 56. IVL service manager 34 can advise ISP 60 and IPTV content provider 72 that there is a problem.
Scenario 2:
Test results: DDRIVL collector 40, 42 and 44 all no content is available from IPTV content provider 72.
Conclusion: IPTV content provider 72 or closely related infrastructure is likely not operational.
Action: IVL service manager 34 can remove IPTV content provider 72 from availability for all IVL receivers. IVL service manager 34 can advise IPTV content provider 72 that there is a problem.
Scenario 3:
Test results: DDRIVL collectors have reported a particular program is available from IPTV content provider 74 for an extended period of time (e.g., 45 days).
Conclusion: IPTV content provider 74 may be providing stale content that should be rotated.
Action: IVL service manager 34 can advise IPTV content provider 74 that the content may need to be rotated.
Scenario 4:
Test results: DDRIVL collector 40 and 44 both report no content is available from IPTV content provider 70. DDRIVL collector 42 reports content from IPTV content provider 70.
Conclusion: IPTV content provider 70 is operational, but an element of shared infrastructure (not shown) between IPTV content provider 70 and DDRIVL collectors 40 and 44 may be experiencing problems.
Action: IVL service manager 34 can remove IPTV content provider 70 from availability for IVL receivers known to share the likely problematic infrastructure, while leaving them on the available list for IVL receivers not sharing that infrastructure. IVL service manager 34 can advise ISP 60 and IPTV content provider 70 of the problem. In this case, a shared hub, line, router or other network element could be the culprit.

Scenario 5:
Test results: DDRIVL collector 40 and 42 both report poor data rates from IPTV content provider 72. DDRIVL collector 44 reports no problems in content from IPTV content provider 72.
Conclusion: IPTV content provider 72 is operational, but the network may be experiencing data traffic congestion. ISP 60 may be experiencing problems, or the connection from ISP A to content provider 72 may be experiencing problems.
Action: IVL service manager 34 can remove IPTV content provider 72 from availability for IVL receivers 50 and 52, while leaving them on the available list for IVL receivers 54 and 56. In the alternative, if the data rate is serviceable, the resolution available can be decreased and VL receivers 50 and 52 can be informed to only use a lower resolution. IVL service manager 34 can advise ISP 60 and IPTV content provider 72 that there is a problem.
Scenario 6:
Test results: Any DDRIVL collector reports no content for a particular program on IPTV content provider 72. Other content is accessible from IPTV content provider 72.
Conclusion: IPTV content provider 72 is operational, but a particular program is not.
Action: IVL service manager 34 can remove the program from listing for IPTV content provider 72 from availability for all IVL receivers. IVL service manager 34 can advise IPTV content provider 72 that there is a problem with the program.

Figure 6:
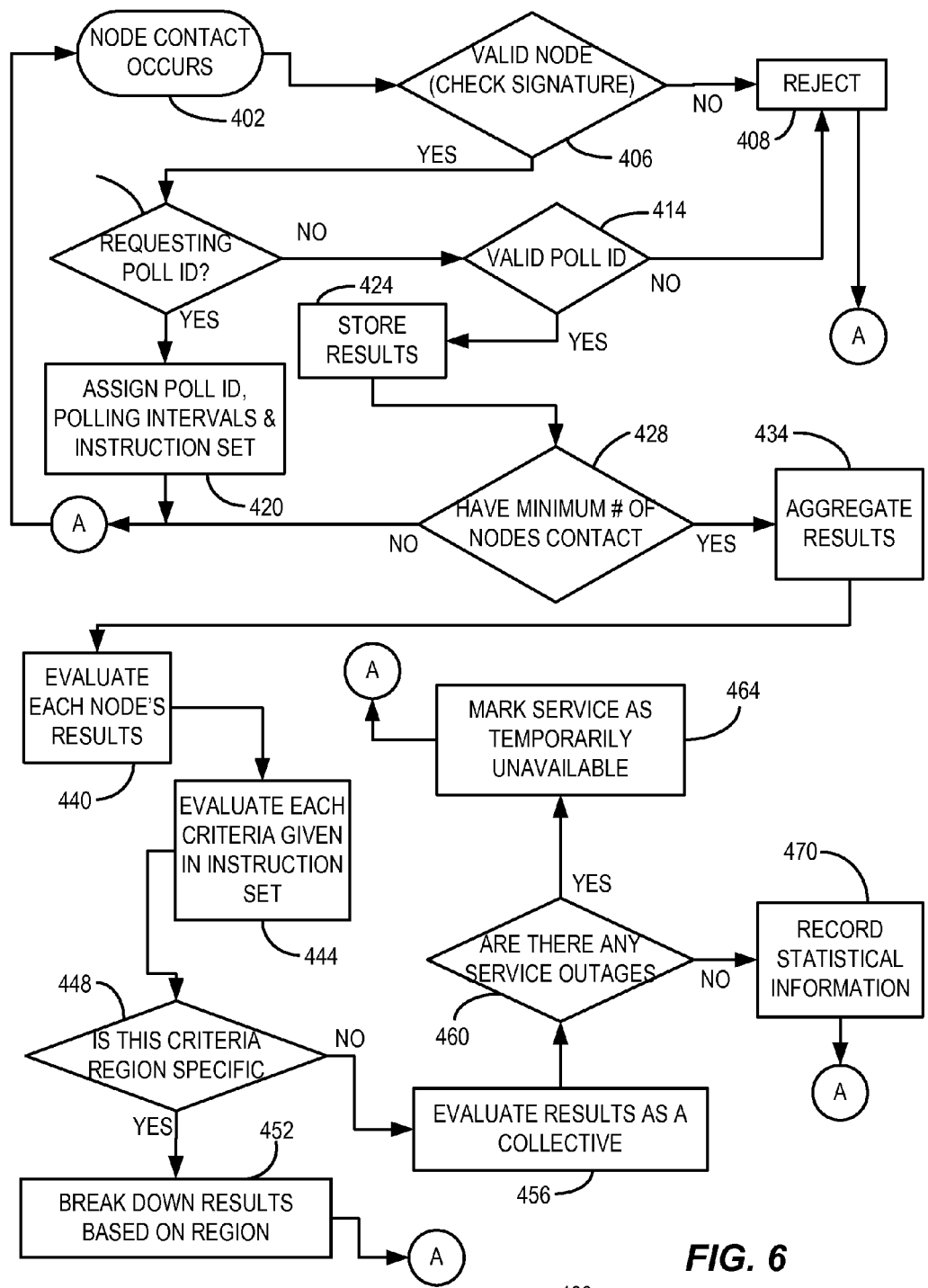
FIG. 6 is a flow chart depicting exemplary operation of the aggregator consistent with certain embodiments of the present invention.

Referring now to FIG. 6, a flow chart depicting operation of the aggregator 30 is depicted in flow chart form as 400 starting at 402 where a node contact occurs between the aggregator and one of the DDRIVL collectors 24. At this point the signature of the DDRIVL collector 24's signature is checked for validity to assure that the device is authorized by the network at 406. If not, the device is rejected at 408 and no further action is taken except to await another node contact at 402. The poll identity can be requested at 410 if the DDRIVL collector node is valid at 406. If no poll identity is requested at 410, the validity of the poll identity is checked at 414 with invalidity resulting in rejection at 408. If a poll ID is requested at 410 it is assigned along with long and short poll time intervals and an instruction set (to instruct the DDRIVL collector 24 as to what tests to carry out and what content providers, ISPs, etc. are to be tested at 420, and control returns to await the next node contact. If the poll ID is valid at 414, the results of the poll are stored at 424. If on examination of the results at 424, a minimum number of nodes have not yet been contacted at 424 control passes to 402 at 428. If a minimum number of nodes has been contacted at 428, the results are used to aggregate the data and assess the network situation at 434. This is carried out by evaluation of each node's results at 440 which breaks down to evaluation of criteria given in an instruction set to the DDRIVL collector at 444 (such as that assigned at 420). To evaluate the criteria, it is determined if the criteria is region specific at 448 and if so, the results are broken down to based on region to perform any required actions (e.g., disabling IVL receivers in a particular region or notifying a regional node of a potential problem). At 452, if a criterion is region specific and the outage is localized to that region, the region can be flagged as being defective. The aggregator can then potentially direct more nodes to test this particular region in the future poll intervals in order to help isolate the issue.

If the problem is not region specific at 448, the results are analyzed as a collective at 456. A collective decision is made by evaluating the criteria over all of the nodes that have reported in and make a decision whether a particular service is available or not. After such evaluation, it can be determined if there are any service outages at 460. and if so, the service is marked as temporarily unavailable at 464 and the related IVL receivers are notified so that the service does not appear on its program guide. If there are no service outages at 460, the information is recorded so as to maintain statistical information at 470. The following metrics can be recorded with all metrics being analyzed by comparing results from multiple nodes: 1) Download bitrate (could be an average or regional or both); 2) Response time (could be an average or regional or both); and 3) Service specific information can be tracked and recorded (number of videos available, video codec, video bitrates, etc). Those skilled in the art will appreciate that other metrics can be measured and factored into the analysis to determine which services are available at various locations in the network. The service can also be regulated to assure that the highest quality video and audio can be used given the current state of the network.

Figure 7:
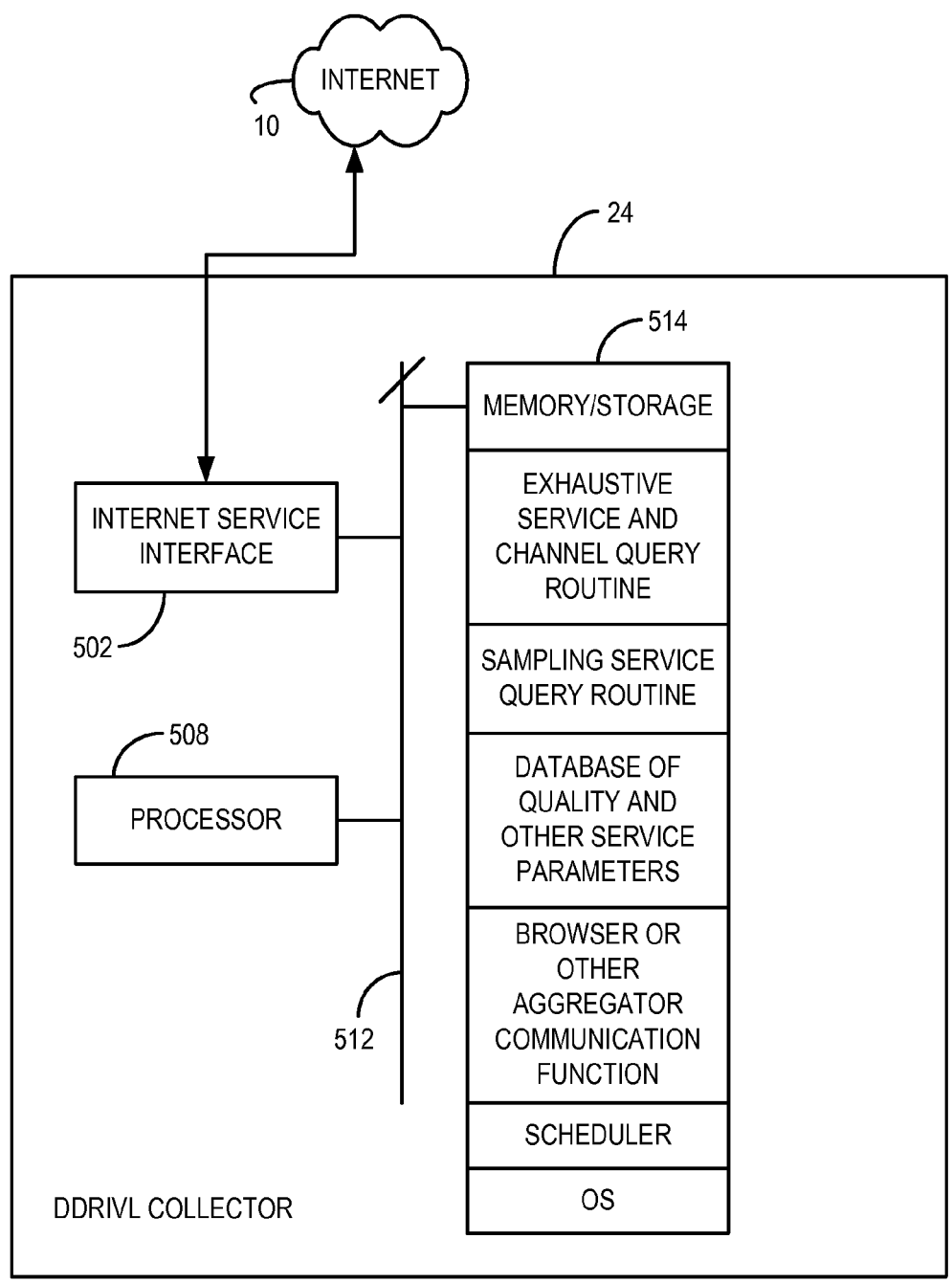
FIG. 7, is an exemplary block diagram illustrating a DDRIVL collector device consistent with certain embodiments.

Referring now to FIG. 7, an exemplary DDRIVL collector device 24 is depicted which incorporates an interface to the Internet 502, which could be a cable connection to a cable modem or an Ethernet connection or the like. As previously noted, the DDRIVL collector 24 can have a LAMP hardware and software or firmware architecture. The interface 502 is connected to processor 508 via any suitable bus structure such as 512 (which may represent multiple busses). A memory 514 is used by processor 508 to carry out the various functions of the collector device and incorporates an operating system (e.g., a Linux kernel) which operates in a conventional fashion. The memory (which may include persistent storage such as EERAM memory or disc drive as well as dynamic random access memory) stores routines for carrying out exhaustive channel and service queries as described above on, for example, a daily basis, as well as routines for simply sampling the various services for one or a few channels. A database is stored therein to carry the queried data. The results of the query are scheduled by a scheduler routine and stored in the database for conveyance to the aggregator on a regular basis.

Hence, systems such as the illustrative embodiment shown can be used to calculate where and when new CDNs and servers need to be placed in the network. The concept of multiple nodes reporting statistics to a central system and a redundant backup system, which are used to calculate QoS permits centralized control over the network. A voting system can be used in the aggregator to aggregate statistics from multiple nodes into a single value that can be used to judge a content provider. The algorithm for carrying out the aggregation can be a simple majority vote of affected nodes or can evolve into more complex algorithms as the network advances in complexity.

Some of the relevant DDRIVL features consistent with the present embodiment (but not necessarily requirements of a system consistent with the present invention involve use of a distributed system capable of judging the Internet from multiple points of interest. This minimizing creating any false positive alarms and also allows developers and customer support to easily diagnose problems and develop better content delivery systems. Also, other entities can be provided access to the data by emailing reports generated by DRIVL or can be given user accounts to access data pertinent to their particular service (e.g., an ISP or an IPTV content provider). This information allows them to diagnose problems and improve performance based on the metrics gathered by DRIVL. DRIVL can be used to make assessments on service providers, QoS, content freshness, content quality, and content quantity based on statistics easily viewable on DRIVL's web interface. DRIVL need not only be used to identify issues surrounding IVL, but can further be used to aid in monitoring any realtime content delivery technology. It can be deployed as a distributed system, thereby, mitigating any problems a single node and a single point of failure can cause.

Thus, in one embodiment, an Internet Protocol Television (IPTV) information collector device has an Internet interface for communication with an aggregator via the Internet and for communication with IPTV service providers. A processor functions to carry out a process of: conducting a query of an IPTV service and at least one IPTV channel supplied thereby; gathering quality of service (QOS) information from the at least one IPTV channel of the IPTV service as a result of the query; and reporting the QOS service to an aggregator device.

In certain embodiments, conducting the query involves conducting a query of a plurality of all available IPTV service providers as assigned to the IPTV information collector device. In certain embodiments, conducting the query involves conducting a query of all available channels of a plurality of all available IPTV service providers as assigned to the IPTV information collector device. In certain embodiments, the query and reporting are conducted on a periodic basis. In certain embodiments, conducting the query involves conducting a sample query of a sample of channels of a plurality of all available IPTV service providers as assigned to the IPTV information collector device; and conducting an exhaustive query of all available channels of the plurality of all available IPTV service providers as assigned to the IPTV information collector device. In certain embodiments, the queries are conducted at intervals assigned to the collector device by the aggregator device. In certain embodiments, the sample query is conducted on a first periodic basis, and wherein the exhaustive query is conducted on a second periodic basis, and wherein the second period is longer than the first period. In certain embodiments, the QoS information includes a maximum or fixed resolution of a particular channel. In certain embodiments, the QoS information includes a bit rate for service received by the collector from a particular channel or service provider. In certain embodiments, the device can be implemented in a LAMP box. In certain embodiments, the device is identified by a poll ID obtained assigned to the collector device by the aggregator device. In certain embodiments, the query is conducted at an interval assigned to the collector device by the aggregator device.

In another embodiment, an Internet Protocol Television (IPTV) information collector device has an Internet interface for communication with an aggregator via the Internet and for communication with IPTV service providers. A processor functions to carry out a process of conducting a query of an IPTV service and at least one IPTV channel supplied thereby; gathering quality of service (QOS) information including a maximum or fixed resolution measure from available IPTV channels and IPTV service assigned to the device as a result of the query; and reporting the QOS service to an aggregator device; wherein conducting the query involves: conducting a sample query of a sample of channels of a plurality of all available IPTV service providers as assigned to the IPTV information collector device; and conducting an exhaustive query of all available channels of the plurality of all available IPTV service providers as assigned to the IPTV information collector device; and wherein the sample query is conducted on a first periodic basis, and wherein the exhaustive query is conducted on a second periodic basis, and wherein the second period is much longer than the first period.

In certain embodiments, In certain embodiments, the QOS information includes a bit rate for service received by the collector from a particular channel or service provider. In certain embodiments, the device can be implemented in a LAMP box. In certain embodiments, the queries are conducted at intervals assigned to the collector device by the aggregator device.

Another method of quality of service (QOS) data aggregation and service management for Internet Protocol Television (IPTV) involves receiving data from a plurality of DDRIVL collector device representing QOS service for sets of IPTV content providers assigned to each collector device, with each collector device being in a separate specified region of Internet service; evaluating from a geographic and interconnection perspective the data from the plurality of collector devices to isolate IPTV receivers located in areas where problems with IPTV service is likely to be occurring; and populating the isolated IPTV receivers with channel set tuning information that either excludes or flags the channels that may be having problems with IPTV service.

In certain embodiments, the channel set tuning information is reflected in an on screen displayed electronic program guide. In certain embodiments, the method further involves automatically notifying operators of nodes within the Internet of problems that may be occurring with their equipment as indicated by the evaluation of the geographic and interconnection perspective evaluation. In certain embodiments, the method further involves issuing commands to a DDRIVL collector to collect additional quality of service information to further isolate a problem. In certain embodiments, the QOS information includes a maximum or fixed resolution of a particular channel. In certain embodiments, data are received from the plurality of collectors as a result of query and reporting that are conducted on a periodic basis. In certain embodiments, the querying and reporting are conducted at intervals assigned to the collector device by an aggregator device. In certain embodiments, the QOS information includes a bit rate for service received by the collector from a particular channel or service provider.

Another method of quality of service (QOS) data aggregation and service management for Internet Protocol Television (IPTV) involves receiving data from a plurality of DDRIVL collector device representing QOS service for sets of IPTV content providers assigned to each collector device, with each collector device being in a separate specified region of Internet service; wherein data are received from the plurality of collectors as a result of query and reporting that are conducted on a periodic basis, and wherein the QOS information includes a maximum or fixed resolution of a particular channel; evaluating from a geographic and interconnection perspective the data from the plurality of collector devices to isolate IPTV receivers located in areas where problems with IPTV service is likely to be occurring; providing the evaluation to a service manager that populates the isolated IPTV receivers with channel set tuning information that either excludes or flags the channels that may be having problems with IPTV service, wherein the channel set tuning information is reflected in an on screen displayed electronic program guide.

In certain embodiments, the service manager further automatically notifies operators of nodes within the Internet of problems that may be occurring with their equipment as indicated by the evaluation of the geographic and interconnection perspective evaluation. In certain embodiments, the method further involves issuing commands to a DDRIVL collector to collect additional quality of service information to further isolate a problem. In certain embodiments, the QOS information includes a bit rate for service received by the collector from a particular channel or service provider. In certain embodiments, the querying and reporting are conducted at intervals assigned to the collector device by an aggregator device.

Those skilled in the art will recognize, upon consideration of the above teachings, that certain of the above exemplary embodiments are based upon use of one or more programmed processors, computers or other programmable devices. However, the invention is not limited to such exemplary embodiments, since other embodiments could be implemented using hardware component equivalents such as special purpose hardware and/or dedicated processors. Similarly, general purpose computers, microprocessor based computers, microcontrollers, optical computers, analog computers, dedicated processors, application specific circuits and/or dedicated hard wired logic may be used to construct alternative equivalent embodiments.

Certain embodiments described herein, are or may be implemented using one or more programmed processors executing programming instructions that are broadly described above in flow chart form that can be stored on any suitable electronic or computer readable storage medium and/or can be transmitted over any suitable electronic communication medium. However, those skilled in the art will appreciate, upon consideration of the present teaching, that the processes described above can be implemented in any number of variations and in many suitable programming languages without departing from embodiments of the present invention. For example, the order of certain operations carried out can often be varied, additional operations can be added or operations can be deleted without departing from certain embodiments of the invention. Error trapping can be added and/or enhanced and variations can be made in user interface and information presentation without departing from certain embodiments of the present invention. Such variations are contemplated and considered equivalent.

While certain embodiments herein were described in conjunction with specific circuitry that carries out the functions described, other embodiments are contemplated in which the circuit functions are carried out using one or more programmed processors. General purpose computers, microprocessor based computers, micro-controllers, optical computers, analog computers, dedicated processors, application specific circuits and/or dedicated hard wired logic, analog circuitry, pluralities of such devices and combinations of such devices in centralized or distributed configurations may be used to construct alternative equivalent embodiments. Other embodiments could be implemented using hardware component equivalents such as special purpose hardware and/or dedicated processors.

While certain illustrative embodiments have been described, it is evident that many alternatives, modifications, permutations and variations will become apparent to those skilled in the art in light of the foregoing description.

What is claimed is:

1. A method of quality of service (QOS) data aggregation and service management for Internet Protocol Television (IPTV), comprising:
    receiving data from a plurality of DDRIVL (Distributed Diagnostics for the Internet Video Link) collector devices representing QOS service for sets of IPTV content providers assigned to each DDRIVL collector device, with each DDRIVL collector device being in a separate specified region of Internet service;
    where the data received from the plurality of DDRIVL collector devices is generated by analysis of video received at each DDRIVL collector device;
    where data are received from the plurality of DDRIVL collector devices as a result of query of the DDRIVL collector devices and reporting by the DDRIVL collector devices that are conducted on a periodic basis, and wherein the QOS information includes a maximum or fixed resolution of a particular channel;
    evaluating from a geographic and interconnection perspective the data from the plurality of DDRIVL collector devices to isolate IPTV receivers located in areas where problems with IPTV service is likely to be occurring;
    providing the evaluation to a service manager that populates the isolated IPTV receivers with channel set tuning information that excludes the channels that may be having problems with IPTV service, wherein the channel set tuning information is reflected in an on-screen displayed electronic program guide;
    where the service manager further automatically notifies operators of nodes within the Internet of problems that may be occurring with their equipment as indicated by the evaluation of the geographic and interconnection perspective evaluation; and
    issuing commands to at least one DDRIVL collector to collect additional quality of service information to further isolate a problem;
    where the querying and reporting are conducted at intervals assigned to the DDRIVL collector device by an aggregator device.

2. The method according to claim 1, wherein the QOS information includes a bit rate for service received by the DDRIVL collector device from a particular channel or service provider.

* * * * *